(12) United States Patent
Matthias

(10) Patent No.: US 8,372,535 B2
(45) Date of Patent: Feb. 12, 2013

(54) BATTERY WITH SEVERAL CELLS CONNECTED BY AN ELECTRICALLY CONDUCTIVE ADHESIVE

(75) Inventor: Wolf Matthias, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 450 days.

(21) Appl. No.: 12/466,200

(22) Filed: May 14, 2009

(65) Prior Publication Data

US 2010/0009252 A1 Jan. 14, 2010

(30) Foreign Application Priority Data

Jul. 11, 2008 (DE) .......................... 10 2008 040 343

(51) Int. Cl.
*H01M 2/24* (2006.01)

(52) U.S. Cl. ........... 429/160; 429/158; 429/159; 429/99

(58) Field of Classification Search ................. 429/160, 429/158, 159, 149, 99, 123
See application file for complete search history.

(56) References Cited

U.S. PATENT DOCUMENTS

| 4,687,553 | A  | * | 8/1987  | Solomon et al. | ................. 205/65 |
| 2004/0203268 | A1 | * | 10/2004 | Nishizawa | ....................... 439/91 |
| 2005/0227519 | A1 | * | 10/2005 | Perry | ............................ 439/157 |

* cited by examiner

*Primary Examiner* — Raymond Alejandro
(74) *Attorney, Agent, or Firm* — Merchant & Gould P.C.

(57) ABSTRACT

An accumulator (i.e., battery) with at least two accumulator cells which are arranged in an accumulator housing and which are connected electrically with each other by a connector element. At least one of the accumulator cells is electrically connected with the connector element by an electrically conductive adhesive.

12 Claims, 2 Drawing Sheets ic adhesive.

BATTERY WITH SEVERAL CELLS CONNECTED BY AN ELECTRICALLY CONDUCTIVE ADHESIVE

TECHNICAL FIELD

The present invention concerns an accumulator with at least two accumulator cells, which are arranged in an accumulator housing and which are electrically connected with each other by a connector element.

BACKGROUND

Accumulators are known from the state of the art with several accumulators that are switched together as packs or modules and at which the accumulator cells that are arranged in an assigned accumulator housing are electrically connected with each other by so-called cell connectors. The individual accumulator cells are hereby usually welded with the cell connectors, for example by electrical spot welding. During the electrical spot a welding a default heat amount is imported by a corresponding current flow into the material of the accumulator cells and cell connectors that has to be connected in order to melt it at least for a short period of time.

The disadvantage of the state of the art is that the achievable welding quality at the electrical spot welding depends on a selection of applicable welding parameters, for example the duration and current height of the current flow. The selection of the applicable welding parameters depends furthermore on a corresponding construction of the accumulator cells and cell connectors, for example accumulator cell material and—wall material, cell connector material and—thickness. But a selection of different welding parameters might be already required at slight changes of the construction of the accumulator cells and cell connectors in order to maintain a sufficient welding quality.

Furthermore, different welding parameters might be required if different alternative accumulator cells are allowed for a default accumulator type, for example NiCd, NiMh, and Li-Ion. A Li-Ion-cell is moreover problematic in that they are usually very heat-sensitive so that a damage of the cells might occur under circumstances at a too high current flow or a too high energy at the electrical spot welding, which could be helpful for creating a corresponding welding connection. Therefore, the selection of applicable welding parameters is a constant error source at the electrical spot welding of accumulator cells with cell connectors.

SUMMARY

It is therefore the task of the invention to provide a new accumulator with several accumulator cells, at which a secure, stabile and electrically conductive connection of at least two accumulator cells is enabled by a connector element, whereby the above described disadvantages of the state of the art are avoided.

This problem is solved by an accumulator with at least two accumulator cells, which are arranged in an accumulator housing and which are electrically connected with each other by a connector element. At least one of the accumulator cells is connected with the connector element by an electrically conductive adhesive.

The invention enables therefore a secure and stabile connection between the connector element and the accumulator cells by the electrically conductive adhesive. Therefore, an introduction of a default heat amount into the material of the connector element and the accumulator cells that has to be connected can be waived so that a hereby possible damage of the accumulator cells is avoided.

According to an embodiment, the adhesive provides a synthetic resin and at least one electrically conductive component. The synthetic resin preferably provides epoxy resin and/or 2K-epoxy resin that can be activated by light. The at least one electrically conductive component is preferably silver powder.

Therefore solid and stabile adhesive connections can be created, which provide good electrical conductivities, which can be located in the area of well conductive metals depending on the corresponding electrically conductive component.

According to an embodiment the accumulator housing provides at least one housing part, which presses the connector element against the at least one of the accumulator cells. A pressure element can be provided between the housing part and the connector element. The pressure element preferably provides elastic foam. In order to fix the connector element the pressure element can be connected by an adhesive element at least progressively with one of the accumulator housing or the at least one of the accumulator cells.

The invention enables thereby an efficient fixing of a simply construed connector element on the accumulator cell or at the accumulator housing for curing the adhesive.

According to an embodiment the connector element provides at least one fixing element for fixing the connector element at the accumulator housing. The fixing element is preferably construed to caulk, rest and/or to clip in the connector element into the accumulator housing.

The invention enables therefore a simple and uncomplicated fixing of the connector element at the accumulator housing for curing the adhesive.

The problem that has been mentioned in the beginning is also solved by a connector element for an electrically conductive connection of at least two accumulator cells of an accumulator that are arranged in an accumulator housing. At least one of the accumulator cells is connected with the connector element by an electrically conductive adhesive.

BRIEF DESCRIPTION OF THE DRAWINGS

The invention is further explained in the following description by an embodiment that is illustrated in the drawings. It is shown.

DETAILED DESCRIPTION

Figure 1:
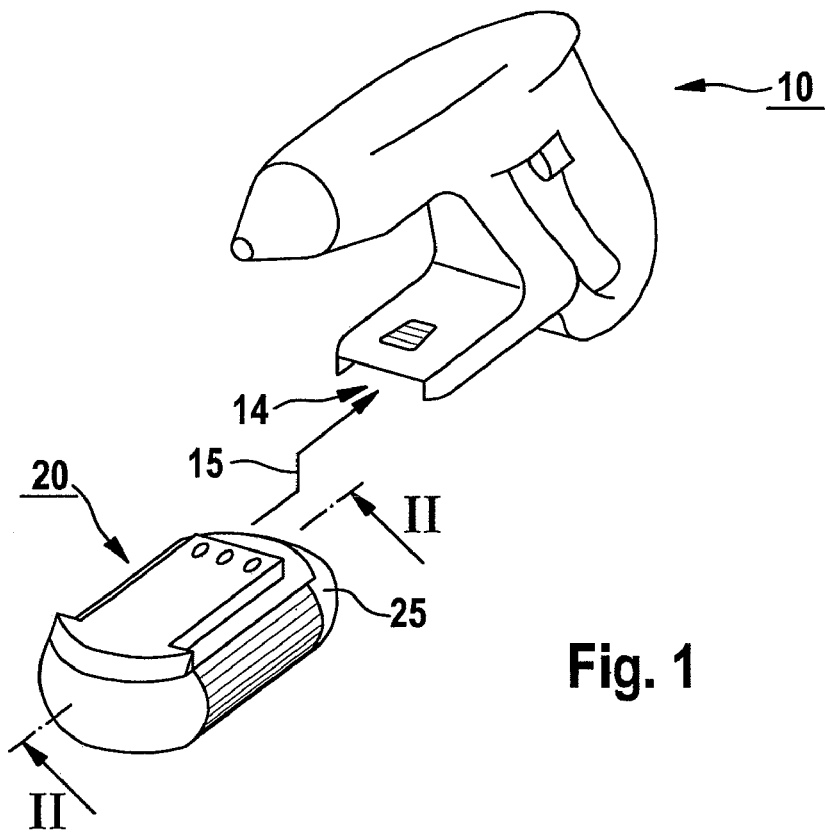
FIG. 1 shows a perspective illustration of an electric machine tool with an accumulator according to the invention.

FIG. 1 shows an electric machine tool 10 and an accumulator 20 with an accumulator housing 25. The electric machine tool 10 can be mechanically and electrically connected by an interface 14 with the accumulator 20 for a network-independent current supply. Therefore the accumulator 20 is shifted into the interface 14 before an activation of the electric machine tool 10 in the direction of an arrow 15 and rests there, whereby an electrical connection is automatically created between the accumulator 20 and the electric machine tool 10.

The electric machine tool 10 is construed in FIG. 1 exemplarily as cordless drill. But it is indicated that the present invention is not limited to cordless drills, but can moreover be used at different battery-operated electric machine tools, for example a rotary hammer, an angle grinder, a lawnmower etc.

Figure 2:
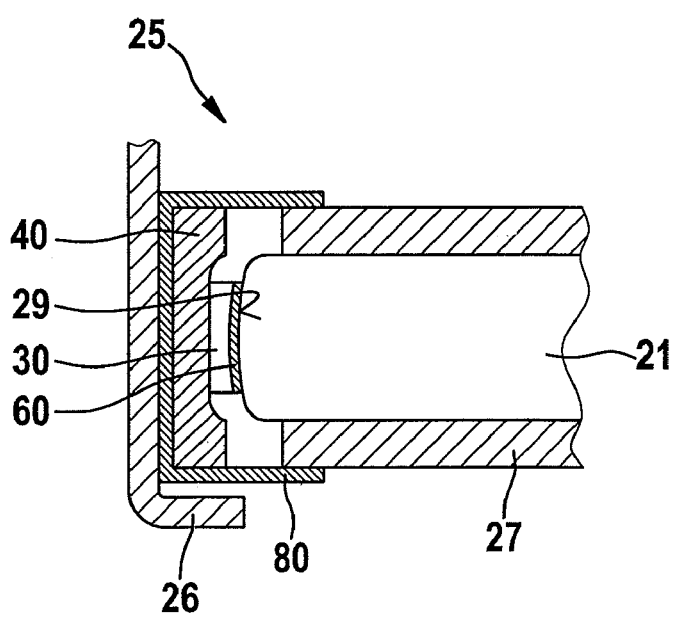
FIG. 2 shows a section view of a section of the accumulator of FIG. 1 with an accumulator cell and a connector element according to an embodiment, looking in the direction of line II-II of FIG. 1.

FIG. 2 shows the accumulator housing 25 of the accumulator 20 of FIG. 1, in which preferably at least two separate accumulator cells 21, 22 (FIG. 4) are arranged, which are connected electrically with each other by a connector element 30, a so-called "cell connector". The accumulator housing 25 provides for example a first housing part 27 for accommodating the accumulator cells 21, 22 (FIG. 4) and a second housing part 26 for their fixing in the first housing part 27. For a better clarity the first housing part 27 is subsequently called "cell container" and the second housing part 26 "housing seal".

According to an embodiment at least the accumulator cell 21 is connected with the cell connector 30 by an electrically conductive adhesive 60. The adhesive 60 preferably provides synthetic resin, for example epoxy resin that can be activated by light and/or 2K-epoxy resin (two component epoxy resin). The synthetic resin is mixed with at least one electrically conductive component. Preferably the synthetic resin is mixed with a percentage of silver powder, which is sufficiently high so that the adhesive 60 provides an electrical conductivity, which is approximately equivalent to the conductivity of a well conducting metal, for example copper.

If the adhesive 60 provides epoxy resin that can be activated by light it can be applied before creating a corresponding adhesive connection on to the accumulator cell 21, or on its cell head 29, and/or on the cell connector 30. If the adhesive 60 provides 2K-epoxy resin one of its components is applied on the cell head 29 before creating a corresponding adhesive connection and its other component is applied on the cell connector 30. In both cases, the cell connector 30 is then pressed against the cell head 29 of the accumulator cell 21 for creating an adhesive connection. When using 2K-epoxy resin such a pressing is sufficient for creating the adhesive connection, while it has to be activated by adding light or an applicable radiation when using epoxy resin that can be activated by light.

According to an embodiment of the invention, the cell connector 30 is pushed or pressed by the container seal 26 against the accumulator cell 21, if it is attached for example at the cell container 27 for closing the accumulator housing 25. The cell connector 30 is therefore fixed in the housing 25 during the cure time of the adhesive 60, which can take several minutes but also days, and pressed against the cell head 29.

As it can be seen in FIG. 2 a pressure element 40 is provided according to the embodiment between the container seal 26 and the cell connector 30, which preferably provides elastic foam. The pressure element 40 serves for a better fixing or a stronger pressing of the cell connector 30 against the accumulator cell 21. Furthermore, the pressure element 40 serves for balancing tolerances, which can occur at the manufacturing of the accumulator housing 25, and protects the accumulator cell 21 against relative movements in the housing 25.

The pressure element 40 is preferably connected for further fixation of the cell connector 30 in the accumulator housing 25 via an adhesive element 80 at least partially with the accumulator housing 25 and/or the accumulator cell 21. The adhesive element 80 is, for example, an adhesive film, adhesive tape or adhesive strip, which is at least partially glued on to the cell container 27. According to an embodiment the adhesive element 80 creates the pressure element 40, which means the cell connector 30 is only fixed at the accumulator housing by the adhesive element 80 and pressed against the cell head 29. Such and further modifications and variations are possible in the range of the present invention.

The adhesive element 80 preferably creates an isolation of the cell head 29 or the cell connector 30 against its environment. Depending on a corresponding pack- or module construction of the accumulator 20 of FIG. 1, such an isolation can be required for example for the cable routing or towards other accumulator cells in the accumulator housing 25.

Figure 3:
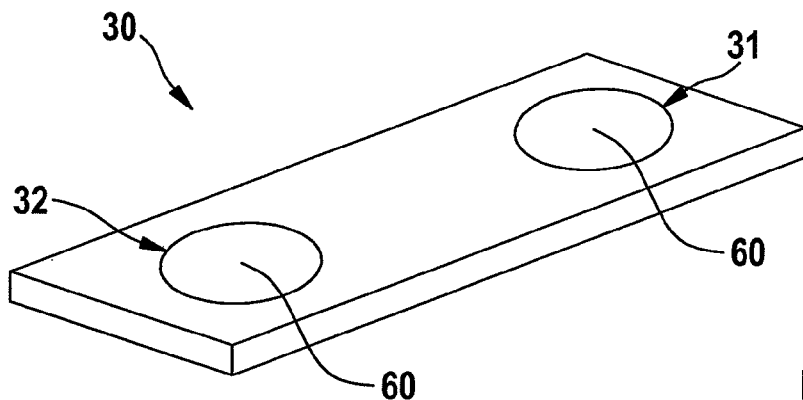
FIG. 3 shows a perspective illustration of the connector element of FIG. 2.

FIG. 3 shows the cell connector 30 of FIG. 2 with two adhesive areas 31, 32, on which the adhesive 60 can be provided or applied. In particular, the use of an adhesive with epoxy resin that can be activated by light can be applied on the adhesive area 31, 32 before manufacturing the accumulator 20 of FIG. 1 and be covered by an applicable covering, in order to avoid its undesired activation. Thereby the cell connector 30 can be produced as a prepared component for the manufacturing of the accumulator 20 of FIG. 1 according to an embodiment.

Figure 4:
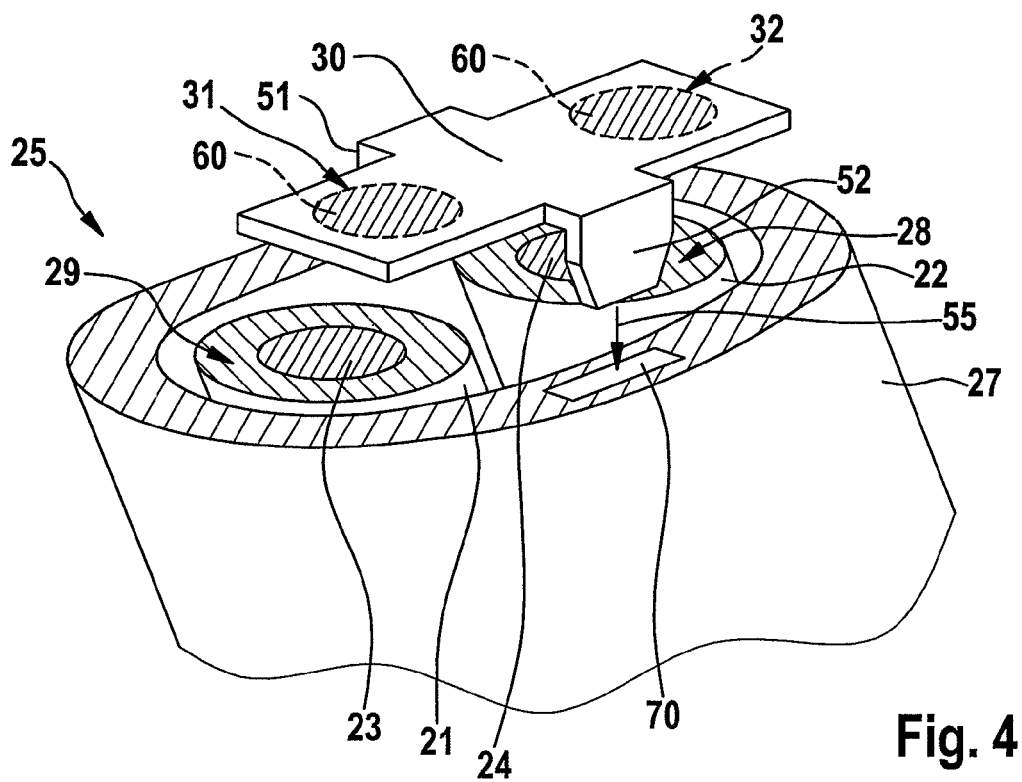
FIG. 4 shows a section view of a section of an accumulator cell with a connector element according to a further embodiment.

FIG. 4 shows an improvement of the cell connector 30 of FIG. 3 for an electrically conductive connection of the accumulator cells 21, 22 in the accumulator housing 25. The adhesive areas 31, 32 of the cell connector 30 are arranged in FIG. 4 with the adhesive 60 on the side of the cell connector 30 that is pointed at the accumulator cells 21, 22 and therefore shown by a dotted line to indicate a transparent way of illustration. The adhesive areas 31, 32 are arranged over counter-adhesive areas 23, 24, which are provided on corresponding cell heads 29, 28 of the accumulator cells 21, 22.

According to the embodiment that is shown in FIG. 4 the cell connector 30 has fixing elements 51, 52 for fixing the connector 30 at the accumulator housing 25. The fixing elements 51, 52 are construed to ensure an applicable fixing of the cell connector 30 during a corresponding cure time of the adhesive 60 in the housing 25. Therefore the cell connector 30 is pressed in the direction of the cell container 27, whereby for example the fixing element 52 is inserted in the direction of an arrow 55 into an assigned opening 70, in which the fixing element 52 is caulked, rested and/or to clipped in.

The invention claimed is:
1. An accumulator comprising:
an accumulator housing;
at least two accumulator cells, wherein each of the accumulator cells has at least one cell head;
a connector element embodied as a cell connector, wherein the cell connector is configured to electrically connect two of the cell heads of the accumulator cells; and
an electrically conductive adhesive configured to electrically connect the cell connector with at least one of the cell heads of the accumulator cells;
wherein the at least two accumulator cells and the cell connector are located in the accumulator housing;
wherein the accumulator housing comprises at least two housing parts, wherein at least one of the at least two housing parts is configured to press the cell connector against the cell heads of the accumulator cells; and a pressure element is arranged between at least one of the at least two housing parts and the connector element, the pressure element comprising an elastic foam.
2. The accumulator of claim 1, wherein the electrically conductive adhesive comprises a synthetic resin and at least one electrically conductive component.

3. The accumulator of claim 2, wherein the synthetic resin comprises at least one of an epoxy resin that is activated by light and a two component epoxy resin.

4. The accumulator of claim 2, wherein the at least one electrically conductive component is a silver powder.

5. The accumulator of claim 1, wherein the accumulator housing comprises at least one container seal that presses the connector element against at least one of the accumulator cells.

6. The accumulator of claim 5, wherein a pressure element is arranged between the at least one container seal and the connector element.

7. The accumulator of claim 6, wherein the pressure element is connected at least partially to one of the accumulator housing and at least one of the at least two accumulator cells for fixing the connector element by an adhesive element.

8. The accumulator of claim 7, wherein the connector element comprises at least one fixing element for fixing the connector element at the accumulator housing.

9. The accumulator of claim 8, wherein the at least one fixing element is used to at least one of: caulk; rest; and clip the connector element in the accumulator housing.

10. The accumulator of claim 1, wherein the pressure element is connected at least partially to one of the accumulator housing and at least one of the at least two accumulator cells for fixing the connector element by an adhesive element.

11. The accumulator of claim 10, wherein the connector element comprises at least one fixing element for fixing the connector element at the accumulator housing.

12. The accumulator of claim 11, wherein the at least one fixing element is used to at least one of: caulk; rest; and clip the connector element in the accumulator housing.

* * * * *